(12) United States Patent
Sterling et al.

(10) Patent No.: US 6,452,725 B1
(45) Date of Patent: Sep. 17, 2002

(54) THERMALLY STABLE ETALON WAVELENGTH INTERLEAVER-MULTIPLEXER

(75) Inventors: William D. Sterling, Dublin; Gong-en Gu, Pleasanton, both of CA (US)

(73) Assignee: AOC Technologies, Dublin, CA (US)

( * ) Notice: Subject to any disclaimer, the term of this patent is extended or adjusted under 35 U.S.C. 154(b) by 0 days.

(21) Appl. No.: 09/687,853

(22) Filed: Oct. 13, 2000

Related U.S. Application Data
(60) Provisional application No. 60/202,751, filed on May 8, 2000.

(51) Int. Cl.[7] .................................................. G02B 5/28
(52) U.S. Cl. .......................... 359/577; 359/580; 356/454
(58) Field of Search ................................ 359/124, 127, 359/577, 578, 579, 582, 839, 580; 356/454, 506, 519

(56) References Cited

U.S. PATENT DOCUMENTS

| | | | |
|---|---|---|---|
| 3,628,173 A | * 12/1971 | Danielmeyer | 372/103 |
| 5,583,683 A | * 12/1996 | Scobey | 359/127 |
| 5,982,488 A | * 11/1999 | Shirasaki | 356/454 |
| 6,005,995 A | * 12/1999 | Chen et al. | 359/127 |
| 6,104,847 A | * 8/2000 | Seino | 359/127 |
| 6,215,802 B1 | * 4/2001 | Lunt | 372/34 |
| 6,252,716 B1 | * 6/2001 | Paiam | 359/618 |
| 6,278,549 B1 | * 8/2001 | Gaebe | 359/124 |

FOREIGN PATENT DOCUMENTS

| | | | |
|---|---|---|---|
| RU | 1282038 | * 1/1987 | 359/577 |

OTHER PUBLICATIONS

USPTO 2002–0806: English–Language translation of SU 1282038.*
Oriel Corporation Catalog, vol. III, "Optics & Filters", Tables 2 and 3, pps 12–3 and 12–4. Stratford, CT. Copyright 1990.*
M. Shirasaki, "Temperature Insensitive Desgin of Fabry–Perot Etalon", IEEE Photonics Technology Letters, vol. 11, No. 11, Nov. 1999, pp. 1431–1433.*
M. Ogusu, et al., "A Thermally Stable Fabry–Perot Tunable Filter for 1 A–Spaced High–Density WDM Systems", IEEE Photonics Techn. Lett., vol. 5, No. 10, Oct. 1993, pp. 1222–1224.*
S. Mitachi, et al., "Athermal glass for the infrared", Applied Optics, vol. 30, No. 10, Apr. 1, 1991, pp. 1285–1289.*

\* cited by examiner

*Primary Examiner*—Cassandra Spyrou
*Assistant Examiner*—John Juba, Jr.
(74) *Attorney, Agent, or Firm*—Howard Cohen

(57) ABSTRACT

A thermally stable etalon filter includes a pair of spaced apart mirrors defining a Fabry-Perot cavity and an optical medium disposed in the cavity. The optical medium is comprised two optically transparent materials, one having a coefficient of thermal expansion that is countervailing to the coefficient of thermal change of refractive index of the other. The thicknesses of the two materials are selected so that the thermal expansion of the optical medium offsets the thermal change in the refractive index, resulting in an etalon filter that is substantially immune to variations caused by temperature. In a further embodiment, the optical medium is comprised of a single material having having a coefficient of thermal expansion and a coefficient of thermal change in refractive index that are functionally opposite. These material properties lead to a beam insertion angle at which the beam refraction is not affected by temperature fluctuations in the material.

4 Claims, 3 Drawing Sheets

THERMALLY STABLE ETALON WAVELENGTH INTERLEAVER-MULTIPLEXER

REFERENCE TO RELATED APPLICATION

This application claims priority based on Provisional Application Ser. No. 60/202,751, filed May 8, 2000 by William D. Sterling and Gong-En Gu

BACKGROUND OF THE INVENTION

In the field of optical communication it is common practice to transmit numerous optical wavelengths separated by small wavelength intervals, often less than 1 nanometer, on a common transmission fiber or free space optical path. Each component wavelength carries a channel of data. At the transmitting and receiving terminal of an optical network, it is necessary to isolate or combine one or a group of these wavelength channels for further processing.

A fixed spacing Fabry Perot interferometer, commonly called an etalon cavity or simply etalon, is capable of mixing or separating closely spaced optical wavelengths by creating optical interference effects as a beam of light experiences multiple reflections between two mirrors etalon cavities have been used in laboratories for spectrographic analysis for over 100 years. A properly designed etalon filter has the very desirable property of very narrow-band transmission, and is well suited to the separation or mixing of closely spaced optical wavelengths that are of interest in optical telecommunications and spectroscopic instruments.

Another characteristic of the etalon is a high sensitivity to temperature changes. The sensitivity is high enough to make the etalon cavity useful for a variety of temperature sensing applications. The temperature sensitivity of the etalon is not desirable for many other applications, including fiber optic telecommunications, where it is desired to maintain constant wavelength transmission characteristics over a wide temperature range. In U.S. Pat. Nos. 5,375,181 and 5,384,877 temperature insensitive etalon filters are described in which thermally reactive support structures change the relative spacing of the 2 reflective elements in an amount sufficient to compensate for thermal effects on the index of refraction of the materials which fill the space of the cavity. These support-actuated designs prove to be excessively long and complex when applied to certain wavelength interleaving applications. Other stabilization techniques include regulating the pressure of a gas between the etalon mirrors, constant temperature ovens, motorized circuits to adjust the mirror spacing, beam angle modifiers, and support materials that apply either radial or axial stress to the etalon cavity. In each case, the thermal compensation modifications add complexity and or size to the device.

It is apparent that etalon devices known in the prior art are not well suited to the conditions of use often found in telecommunications, particularly temperature variations experienced by equipment in the field. This deficiency may lead to diminished utilization of optical communications paths that is far less than the theoretical maximum capacity.

The object of the present invention is to provide an Etalon Filter with a characteristic transmission and reflection property for a single or multiplicity of wavelengths that is stable over a range of temperature changes of the optical element.

It is a further object of the invention to achieve the athermalization of the etalon in a passive manner.

It is yet a further object of the invention to achieve the athermalization of the etalon while having a device size that is substantially the same as an equivalently fabricated non-temperature compensated device.

It is another object of the invention to employ the described etalon to separate a multiplicity of closely spaced optical wavelength channels into 2 or more groups of equally spaced channel subgroups, of which each channel or subgroup of channels have a separate optical path.

It is yet another object of the invention to employ the same described etalon to interleave together a multiplicity of spaced optical wavelengths into a single optical path comprised of more closely spaced optical wavelengths.

The above named objects are achieved by joining two or more different transparent materials to occupy the space between the Fabry Perot mirrors. By selecting the multiple transparent materials according to the teaching outlined below, a non-adjustable etalon can be made with a predetermined thermal sensitivity of a fixed value that is substantially zero.

It is another object of the invention to provide a single material having a coefficient of thermal expansion and a coefficient of thermal change in refractive index that are functionally opposite. These material properties lead to a beam insertion angle at which the beam refraction is not affected by temperature fluctuations in the material.

DESCRIPTION OF THE PREFERRED EMBODIMENTS

Figure 1:
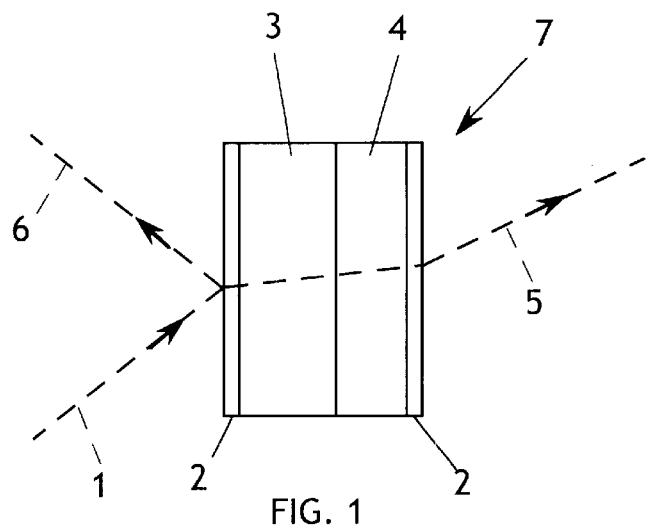
FIG. 1 is a side view of an etalon composed of complementary materials within the mirror cavity.

A simple etalon filter will exhibit regularly spaced transmission maxima (transmission peaks) on a curve drawn according to the following equation:

$$T(\lambda) = \left[1 + \frac{4 \cdot R}{(1-R)^2} \cdot \sin\left(\frac{\delta(\lambda)}{2}\right)^2\right]^{-1}$$

Where $T(\lambda)$ is the relative transmission of the etalon at some wavelength $\lambda$; R is the reflectivity of the cavity mirrors, and $\delta(\lambda)$ is the path length difference between successive internal reflections within the enclosed media of refractive index n. The value of $\delta(\lambda)$ can be evaluated by the following formula:

$$\delta(\lambda) = \frac{2 \cdot \pi}{\lambda} \cdot 2 \cdot n \cdot d \cdot \cos(\theta)$$

Where c is the speed of light, θ is the angle of the input beam incident to the normal of the etalon surface, d is the distance between the etalon mirror surfaces and n is the refractive index of the medium contained between the etalon mirrors. λ is a wavelength variable that is to be evaluated over a wavelength range of interest.

The product of d and the refractive index n is most important to the design of the etalon, this product may be referred to as the "optical path length" or OPL. The optical path length of the medium determines the transmission versus angle characteristic of an etalon filter composed of a medium interposed between the etalon cavity mirrors. In the case where more than one medium is placed between the etalon mirrors, the OPL along a specific path through m different media is $$OPL = \sum_{i=1}^{m} d_i \cdot n_i$$

Where each $d_i$, is a distance through the medium along a specified path and each $n_i$ is the refractive index of the medium. The total path length, OPL is the sum of the distance-index products.

The thermal sensitivity of an etalon filter arises from the characteristic thermal expansion coefficient and the characteristic thermal refractive index coefficient of materials placed between the etalon mirrors. The result is that the OPL or the OPL-sum-of-products vary with temperature and the etalon. A change in the OPL within the etalon shifts the phase relationship of the internally reflected light, and thus the associated interference effect, observed as a reflection or transmission characteristic, will not remain constant over a range of temperatures.

The various optical materials available for use in an etalon have different index and expansion coefficients, which may be either negative or positive in value, and typically both coefficients are on the order of $10^{-6}$ per degree K.

In the exemplary case of two mediums combined, and include the temperature sensitivities we express δ(λ) as follows:

$$\delta(\lambda) = \left(\frac{2 \cdot \pi}{\lambda} \cdot 2\right) \cdot [k \cdot [(n_1 + dn_1 \cdot \Delta T) \cdot d \cdot (1 + \alpha_1 \cdot \Delta T) \cdot \cos(\theta)] +$$
$$(1-k) \cdot [(n_2 + dn_2 \cdot \Delta T) \cdot d \cdot (1 + \alpha_2 \cdot \Delta T) \cdot \cos(\theta)]]$$

where the $dn_1/dt$ and $dn_2/dt$ terms give the rate of refractive index with a change in temperature ΔT and the $\alpha_1$ and $\alpha_2$ terms give the dimensional rate of change with temperature increase ΔT. The total thickness of material 1 is k times the total required thickness d and the total thickness of material 2 is (1−k) times the total required thickness d. This expression can be extended to include any number of materials. If we choose our materials carefully we can make the OPL of the combined materials remain essentially constant over a range of temperatures. If we expand the above equation and drop the high order terms which are not significant compared to the other terms in the expanded equation, we can easily take the derivative of δ(λ) with respect to the temperature change ΔT. The result for a 2 materials combination is:

$$\frac{d}{d\Delta T}\delta(\lambda) =$$
$$4 \cdot \pi \cdot d \cdot \cos(\theta) \cdot \frac{(-k \cdot n_1 \cdot \alpha_1 - k \cdot dn_1 - n_2 \cdot \alpha_2 - dn_2 + k \cdot n_2 \cdot \alpha_2 + k \cdot dn_2)}{\lambda}$$

If the two materials chosen allow the derivative above to have a value of zero for a specific value of k such that 0<k<1, we are assured that the materials, when combined in a thickness ratio according to the value of k, will have a composite OPL that is insensitive to temperature changes. An etalon cavity made with the prescribed combination of materials; i.e., the chosen materials in the determined ratio, will have transmission and reflection characteristics that are substantially constant over a range of temperature changes.

If a derivative acceptably close to zero exists for the two combined materials the relative thickness of material I is $$\frac{-(n_2 \cdot \alpha_2 + dn_2)}{(n_1 \cdot \alpha_b + dn_1 - n_2 \cdot \alpha_2 - dn_2)}$$

Where the total thickness of the combined materials is 1.

Expressions for more than two media can be obtained in the same manner as given above.

An Example

One example of a composite material that results in a thermally insensitive etalon is the use of the commonly used BK7 glass, with crystalline salt, NaCl. These materials have the following properties:

BK7  $n_1 = 1.50094$  $dn_1 = 1.2 \cdot 10^{-6}$  $\alpha_1 = 7.1 \cdot 10^{-6}$ NaCL  $n_2 = 1.525$  $dn_2 = 300 \cdot 10^{-6}$  $\alpha_2 = 40 \cdot 10^{-6}$ The combined materials have a zero derivative when the fraction of the total thickness of BK7

$$\frac{-(n_2 \cdot \alpha_2 + dn_2)}{(n_1 \cdot \alpha_b + dn_1 - n_2 \cdot \alpha_2 - dn_2)} = 0.953$$

And the remaining thickness of NaCl window material is (1−0.953=0.047).

In FIG. 1 an etalon assembly 7 is shown. The etalon is formed by a pair of cavity mirrors 2 which can be mirror elements formed on a substrate or directly on the surfaces of the interposed media. The optical media between the mirrors 2 comprises two optically transparent elements 3 and 4 which have been formed in thickness according the above formula. An input beam 1 enters from the left, and wavelength channel components that correspond to the transmission peaks of the etalon are transmitted (represented by ray 5) and wavelength channels that are not transmitted are reflected in the direction of ray 6. As explained above, this relationship is generally temperature independent when the materials are chosen in accordance with this invention.

Figure 2:
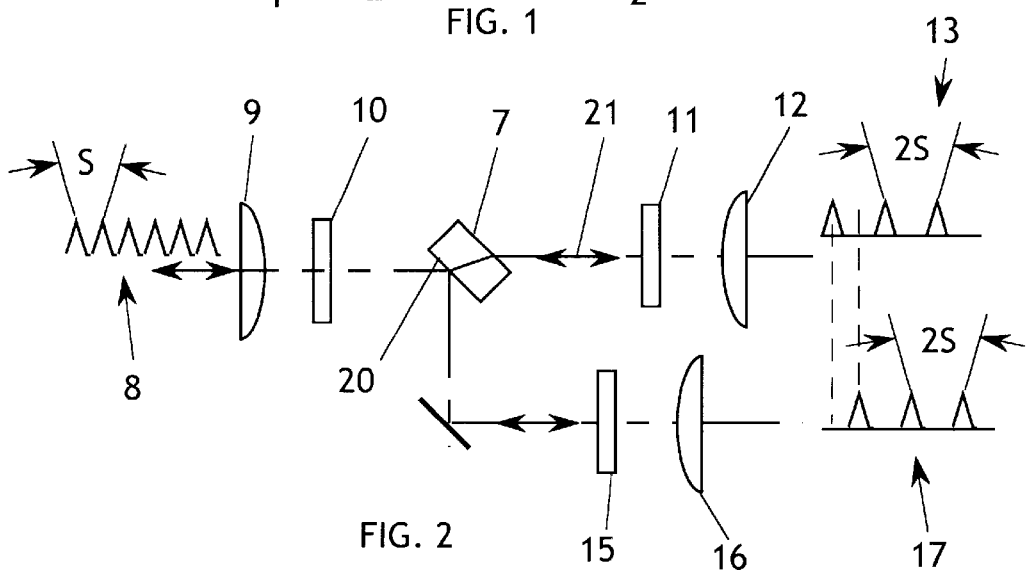
FIG. 2 is a schematic view of the thermally insensitive etalon element employed as signal interleaver/multiplexer element.

Referring to FIG. 2, the etalon assembly 7 which is made up of elements 2, 3, and 4 is arranged to receive a mixed wavelength signal that is first transmitted from a collimating lens 9, and then through an optional polarization rotating element 10 in the case that a particular linear or circular polarization is desired. The etalon transmitted component 21 is then selectively transmitted to a second optional polarizing element 11 providing the complimentary function to element 10 and an output lens 12. The reflected component 20 of the input signal 8 is directed from the etalon 7 to a third complimentary polarizing element 15 and an output lens 16.

In this manner, a group of channels of signal 8 with a spacing S, can be divided into two groups of channels 13 and 17 with a spacing 2×S, as indicated in FIG. 2.

Those experienced in the art will recognize that the optical directions of this system can be reversed. Using 13 and 17 as input beams of different optical wavelength series, one can subsequently mix the two channel sources with the etalon filter to form 8, an interleaved beam, which contains selected wavelengths originating from either source 13 or 17.

Further, it is possible to direct the joined or divided signals obtained from the above system to other etalon filters whereby subsequent divisions or summations can be performed.

Figure 3:
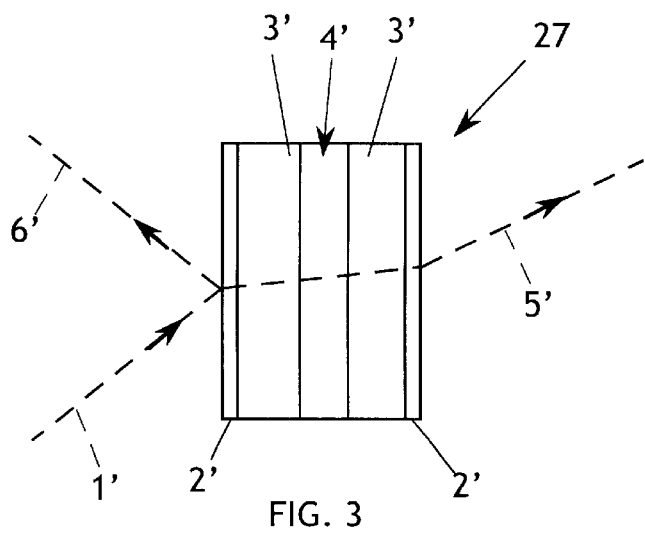
FIG. 3 is a side view of a further embodiment of an etalon composed of sandwiched complementary layers within the mirror cavity.

With regard to FIG. 3, a further embodiment of the etalon filter includes components similar to the embodiment of FIG. 1, and are accorded the same reference numeral with a prime (') designation. Considering the example given above, the NaCl material is water soluble and soft, and requires protection. Accordingly, the BK7 glass material is divided into 2 components or layers 3' and the NaCl layer 4' is sandwiched within the more durable BK7 glass. If necessary the total thickness of the element can be composed of any number of layers of the selected materials as long as the total thickness of all of the enclosed layers achieve the desired ratio.

In a further embodiment of the invention, single materials may also be used to make thermally stable devices, using the fundamental principle of the invention that thermal refractive index changes and thermal expansion changes may be used to offset each other. Certain crystals are known to have different values of thermal expansion and thermal refractive index changes according to the direction in which a beam of light traverses the crystal structure.

For some crystals, one or more of the thermal expansion coefficients and or thermal refractive index coefficients have an opposite sign to the other coefficients such that a direction of temperature insensitive optical path length will exist. As an example, the crystal known as LiSaF has 3 axes, wherein one axis called the "c-axis" has different thermal change coefficients compared to the other two, called the "a-axis" and "b-axis". The relevant data is listed below.

a and b-axis
  Nominal Refractive Index $n_{ab}$=1.45
  Change of refractive index with temperature $dn^{ab}$=−2.5×$10^{-6}$
  Linear Expansion coefficient $\alpha_{ab}$=25×$10^{-6}$
c-axis
  The c-axis is perpendicular to the plane of the a and b axes.
  Nominal Refractive Index $n_c$=1.4
  Change of refractive index with temperature $dn_v$=−4×$10^{-6}$
  Linear Expansion coefficient $\alpha_c$=−10×$10^{-6}$ Many crystals have different values of index and expansion coefficients on each of 3 axes. In the case above 2 axes have identical values and thus allow the inventive principle to be more simply illustrated. In practice the same analysis may be extended to consider any number of axes, including those at non-orthogonal angles.

The thermally insensitive directions through this material can now be identified. To define a specific direction through the crystal, we will measure the angle formed by the optical path relative to the c-axis of the crystal. In the general case, a second angle with respect to either the a-axis or b-axis would also be required. The refractive index value is a function of ΔT along the specified direction, θ is a vector combination of the refractive index changes along the A, B and C axes. In the case of LiSaF it is:

$$n(\theta, \Delta T) = \sqrt{[(n_c + dn_c \cdot \Delta T) \cdot \cos(\theta)]^2 + [(n_{ab} + dn_{ab} \cdot \Delta T) \cdot \sin(\theta)]^2}$$

Where θ is the beam angle with respect to the c-axis, ΔT is the temperature change and the other variables are defined in the table above.

In a similar fashion the thermal expansion of a unit length along the θ direction can be expressed:

$$r(\theta, \Delta T) = \sqrt{[(1 + \alpha_c \cdot \Delta T) \cdot \cos(\theta)]^2 + [(1 + \alpha_{ab} \cdot \Delta T) \cdot \sin(\theta)]^2}$$

where the variables are as defined above.

The optical path length change is the product of the expressions n(θ,ΔT) and r(θ,ΔT). If we take the derivative with respect to the temperature change ,ΔT, then the angle which results in a zero derivative is the direction that will have a optical path length that does not change with temperature. The function we wish to plot is:

$$\frac{d}{d\Delta T} \sqrt{[(n_c + dn_c \cdot \Delta T) \cdot \cos(\theta)]^2 + [(n_{ab} + dn_{ab} \cdot \Delta T) \cdot \sin(\theta)]^2} \cdot$$
$$\sqrt{[(1 + \alpha_c \cdot \Delta T) \cdot \cos(\theta)]^2 + [(1 + \alpha_{ab} \cdot \Delta T) \cdot \sin(\theta)]^2}$$

Figure 4:
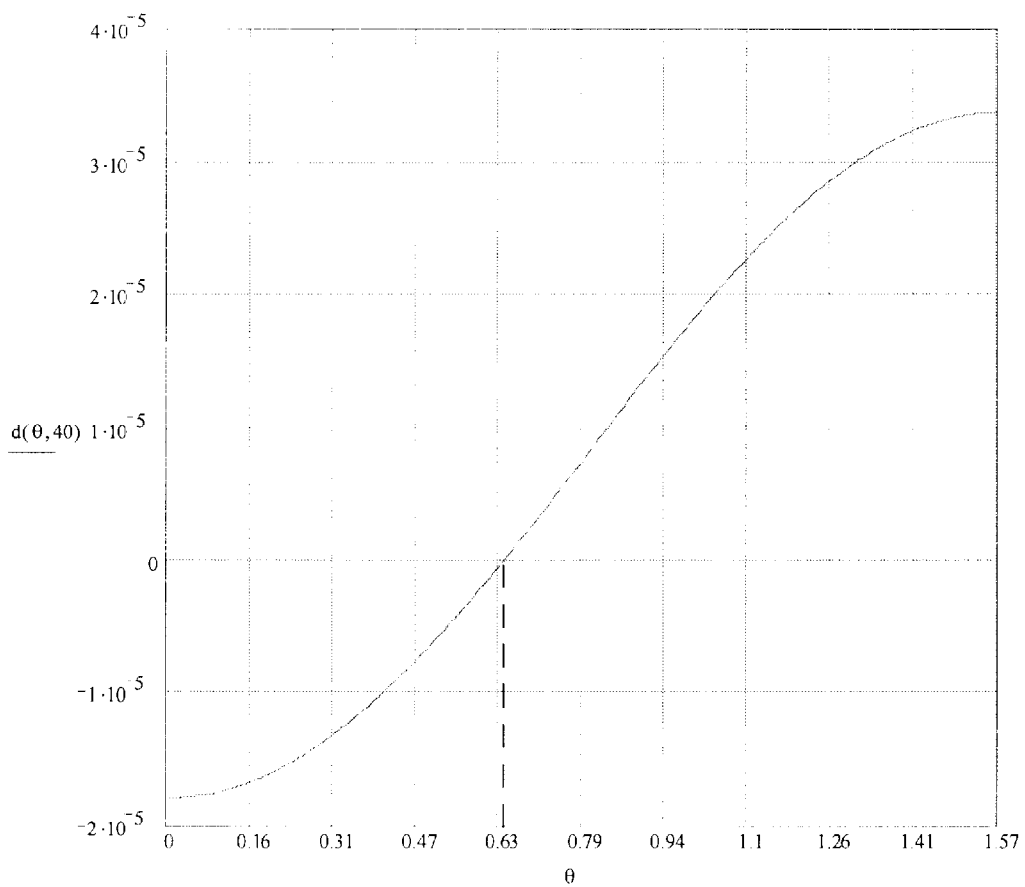
FIG. 4 is a graph depicting the beam transmission function versus beam insertion angle in radians for a material such as LiSaF.

The derivative above signified by the label d(θ,ΔT) is plotted as a function of beam direction angle θ, to give a graphical illustration of LiSaF sensitivity to beam direction. As shown in FIG. 4, the graph illustrates the temperature response of the LiSaF at different directions at an arbitrary temperature change of 40 degrees C., with respect to the room temperature values of index and expansion parameters in the table previously given. The angle θ is in radians.

Figure 5:
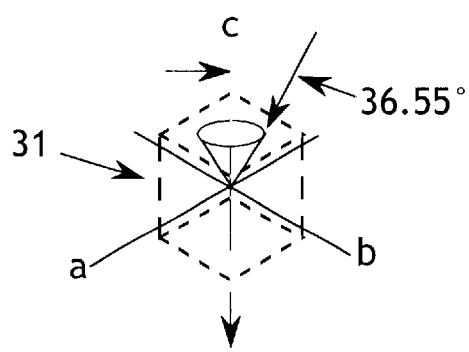
FIG. 5 is a perspective view depicting the beam insertion angle for LiSaF that avoids thermal effects.

The zero derivative occurs at an angle of about 0.63785 radians or 36.55 degrees. Thus, in a LiSaF crystal 31, shown in FIG. 5, due to the equivalence of the a-axis and b-axis constants, this zero-derivative-angle will describe a cone surface inclined at about 36.55° to the crystals c-axis. Any beam traversing the material at an angle of about 36.55° with respect to the C-axis, will have a constant optical path length over temperature change.

The following is an illustration of the performance of LiSaF as an etalon material. The refractive index of LiSaF is a function of wavelength. A more precise value of refractive index is obtained by the Sellmier equations, fitted with the experimentally determined constants for LiSaF:

$$n_{ab}(\lambda) = \sqrt{1.97673 + \frac{0.00309}{\lambda^2 - 0.00935} - 0.00828 \cdot \lambda^2}$$

$$n_c(\lambda) = \sqrt{1.98448 + \frac{0.00235}{\lambda^2 - 0.010936} - 0.01057 \cdot \lambda^2}$$

where λ is the wavelength in microns. The wavelength corrected values of refractive index can be substituted into the previously given equations $$T(\lambda) := \left[1 + \frac{4 \cdot R}{(1-R)^2} \cdot \sin\left(\frac{\delta(\lambda)}{2}\right)^2\right]^1, \delta(\lambda) = \frac{2 \cdot \pi}{\lambda} \cdot 2 \cdot n \cdot d \cdot \cos(\theta)$$

Along with the beam direction-sensitive expansion coefficient and thermal index of refraction previously determined.

$$T(\Delta T, \lambda) = \left[1 + \frac{4 \cdot R}{(1-R)^2} \cdot \sin\left[\frac{2 \cdot \pi}{\lambda} \cdot (D) \cdot \cos(\theta)\right]^2\right]^{-1}$$

where $$D = \sqrt{[(n_c(\lambda) + dn_c \cdot T) \cdot \cos(\theta)]^2 + [(n_{ab}(\lambda) + dn_{ab} \cdot T) \cdot \sin(\theta)]^2} \cdot$$
$$\sqrt{[d \cdot (1 + \alpha_c \cdot T) \cdot \cos(\theta)]^2 + [d \cdot (1 + \alpha_{ab} \cdot T) \cdot \sin(\theta)]^2}$$

and d=the designed physical length of the optical path.

Figure 6:
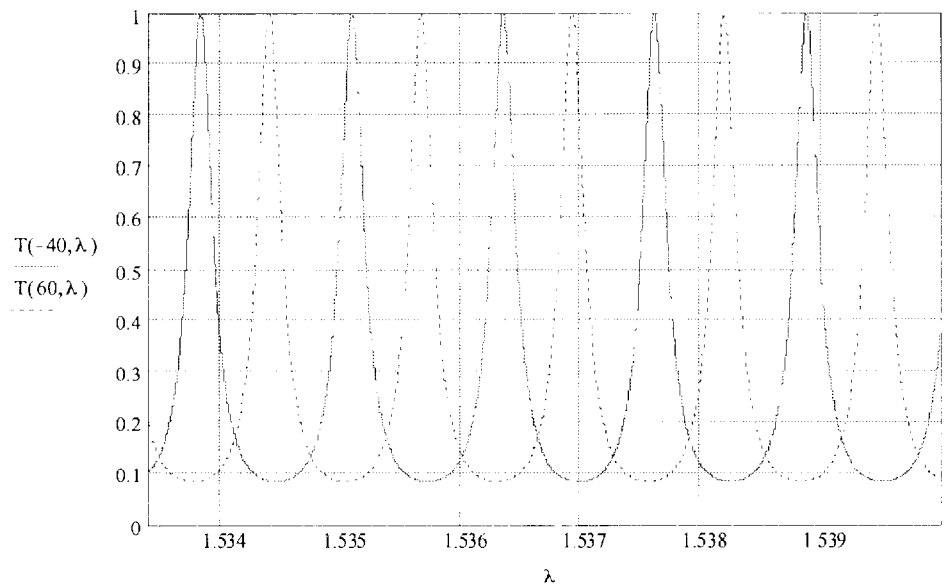
FIG. 6 is a graph depicting relative transmission versus wavelength for LiSaF material at a beam insertion angle not optimized for thermal effects.

With regard to FIG. 6, the effectiveness of this design can be seen by comparing the performance of LiSaF when an etalon structure is constructed at a non-optimized beam angle of 0 degrees, for example. This is merely a beam directed along the c-axis. The graph of relative transmission versus wavelength in microns shows a large shift of transmission peaks between the two temperature changes evaluated, −40 degrees C. and 60 degrees C.

Figure 7:
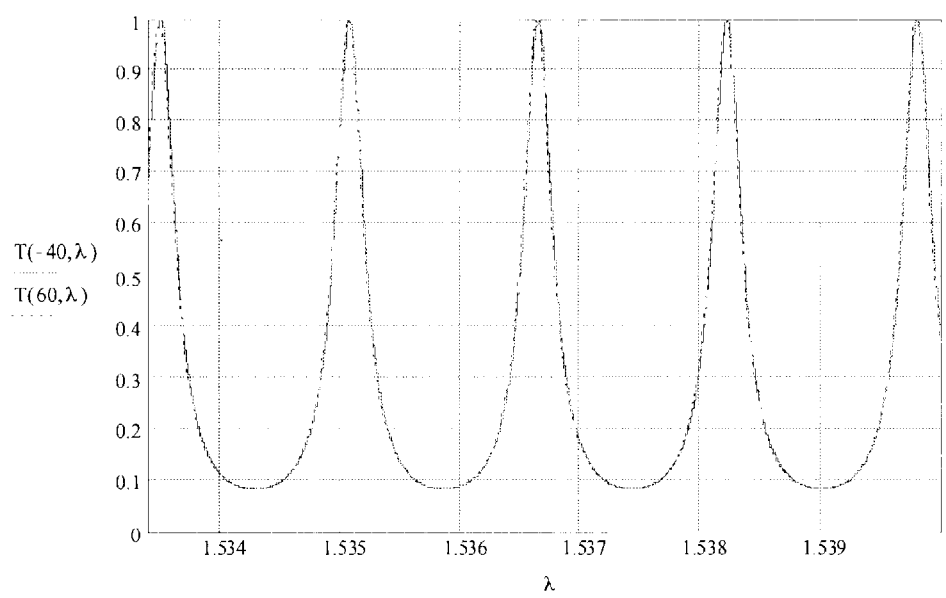
FIG. 7 is graph depicting relative transmission versus wavelength for LiSaF material at a beam insertion angle optimized to avoid thermal effects.

If we follow the prescription for the axis of thermal insensitivity (an internal angle of 36.55 degrees) the transmission curves overlap and yield a thermally insensitive etalon filter. As shown in FIG. 7, the transmission peaks are spaced at regular intervals, and do not shift with changes in temperature.

Thus both embodiments of the invention take advantage of a differential in coefficient of thermal expansion versus coefficient of change of refractive index with temperature, either in a single material or in a pair of materials within an etalon cavity. In either case, the result is an etalon having high thermal stability suitable for multiplexing or demultiplexing of very closely spaced optical signals.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A thermally stable etalon filter, including:
    a pair of reflective surfaces disposed in parallel, spaced apart relationship;
    an optical medium disposed between said reflective surfaces to define a cavity, said optical medium having a net thermal expansion coefficient and a net thermal refractive index coefficient that are opposite in effect and offsetting, whereby the refractive effect of said etalon is unaffected by temperature variations;
    said optical medium including a pair of optically transmissive materials;
    one of said pair of materials having a coefficient of thermal expansion that is countervailing to the coefficient of thermal refractive index of the other of said pair of materials;
    the thickness of said pair of materials being selected to establish an optical path through said cavity that exhibits an optical path length that is essentially constant with changes in temperature in said pair of materials.

2. A thermally stable etalon filter, including:
    a pair of reflective surfaces disposed in parallel, spaced apart relationship;
    an optical medium disposed between said reflective surfaces to defined a cavity, said optical medium having a net thermal expansion coefficient and a net thermal refractive index coefficient that are opposite in effect and offsetting, whereby the refractive effect of said etalon is unaffected by temperature variations;
    said optical medium including a pair of optically transmissive materials;
    one of said pair of materials having a coefficient of thermal refractive index that is countervailing to the coefficient of thermal expansion of the other of said pair of materials;
    the thickness of said pair of materials being selected to establish an optical path through said cavity that exhibits an optical path length that is essentially constant with changes in temperature in said pair of materials.

3. A thermally stable etalon filter, including:
    a pair of reflective surfaces disposed in parallel, spaced apart relationship;
    an optical medium disposed between said reflective surfaces, said optical medium having a net thermal expansion coefficient and a net thermal refractive index coefficient that are opposite in effect and offsetting, whereby the refractive effect of said etalon is unaffected by temperature variations;
    said optical medium including a single optically transmissive material, said single material having a thermal expansion coefficient along a first axis that is countervailing to the coefficient of thermal refractive index along a further axis of said material.

4. The thermally stable etalon filter of claim 3, further including a beam insertion angle at which said thermal expansion coefficient along said first axis counterbalances the coefficient of thermal refractive index along said further axis for said single material.

* * * * *